United States Patent
Suzuki et al.

(10) Patent No.: US 11,410,429 B2
(45) Date of Patent: Aug. 9, 2022

(54) IMAGE COLLECTION SYSTEM, IMAGE COLLECTION METHOD, IMAGE COLLECTION DEVICE, RECORDING MEDIUM, AND VEHICLE COMMUNICATION DEVICE

(71) Applicant: TOYOTA JIDOSHA KABUSHIKI KAISHA, Toyota (JP)

(72) Inventors: Koichi Suzuki, Aichi (JP); Junichiro Igawa, Aichi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 341 days.

(21) Appl. No.: 16/634,210

(22) PCT Filed: Aug. 9, 2018

(86) PCT No.: PCT/JP2018/029916
§ 371 (c)(1),
(2) Date: Jan. 27, 2020

(87) PCT Pub. No.: WO2019/031582
PCT Pub. Date: Feb. 14, 2019

(65) Prior Publication Data
US 2020/0210725 A1    Jul. 2, 2020

(30) Foreign Application Priority Data
Aug. 10, 2017  (JP) .............................. JP2017-155304

(51) Int. Cl.
*G06V 20/58* (2022.01)
*G06F 16/587* (2019.01)
*G06F 16/51* (2019.01)

(52) U.S. Cl.
CPC .............. *G06V 20/58* (2022.01); *G06F 16/51* (2019.01); *G06F 16/587* (2019.01)

(58) Field of Classification Search
CPC ........ G06F 16/51; G06F 16/587; G06V 20/58
See application file for complete search history.

(56) References Cited

U.S. PATENT DOCUMENTS 9,393,961 B1 *  7/2016  Templeton ............. H04N 5/247
9,983,022 B2    5/2018  Horita et al.
(Continued)

FOREIGN PATENT DOCUMENTS

| CN | 105793669 A | 7/2016 |
| JP | 2008-026253 A | 2/2008 |

(Continued)

OTHER PUBLICATIONS

Jul. 15, 2021 Office Action issued in Chinese Patent Application No. 201880051060.2.

*Primary Examiner* — Mia M Thomas
(74) *Attorney, Agent, or Firm* — Oliff PLC

(57) ABSTRACT

An image collection system includes an image obtainment unit configured to obtain an image of a landmark object captured by an imaging unit installed on a vehicle; a positional relationship information obtainment unit configured to obtain positional relationship information representing a positional relationship between the landmark object and the vehicle when the image was captured; and a save processing unit configured to associate the image obtained by the image obtainment unit with the positional relationship information obtained by the positional relationship information obtainment unit, so as to save the associated image on a database.

9 Claims, 7 Drawing Sheets

(56) References Cited

U.S. PATENT DOCUMENTS

| | | | |
|---|---|---|---|
| 10,248,124 B2* | 4/2019 | Bellaiche | G01S 13/931 |
| 11,086,334 B2* | 8/2021 | Fridman | G06T 7/74 |
| 11,263,771 B2* | 3/2022 | Stein | G08G 1/0133 |
| 2007/0206833 A1* | 9/2007 | Otsuka | G06V 20/58 |
| | | | 348/148 |
| 2008/0243378 A1 | 10/2008 | Zavoli | |
| 2012/0069185 A1* | 3/2012 | Stein | G06V 20/58 |
| | | | 348/148 |
| 2013/0170706 A1* | 7/2013 | Mori | G06V 20/56 |
| | | | 382/103 |
| 2016/0305794 A1 | 10/2016 | Horita et al. | |
| 2018/0045516 A1 | 2/2018 | Sumizawa | |
| 2019/0291721 A1* | 9/2019 | Sakano | G08G 1/16 |
| 2019/0384294 A1* | 12/2019 | Shashua | G06V 20/584 |
| 2020/0098135 A1* | 3/2020 | Ganjineh | G06T 7/74 |
| 2021/0365701 A1* | 11/2021 | Eshet | G01C 21/3848 |
| 2022/0027642 A1* | 1/2022 | Shambik | G06T 7/73 |

FOREIGN PATENT DOCUMENTS

| | | |
|---|---|---|
| JP | 2008-045893 A | 2/2008 |
| JP | 2010-519550 A | 6/2010 |
| JP | 2013-036930 A | 2/2013 |
| JP | 2015-108604 A | 6/2015 |
| JP | 2016-095688 A | 5/2016 |
| JP | 2016-176769 A | 10/2016 |
| WO | WO-2019195415 A1 * 10/2019 | ............ B60W 30/08 |

* cited by examiner

IMAGE COLLECTION SYSTEM, IMAGE COLLECTION METHOD, IMAGE COLLECTION DEVICE, RECORDING MEDIUM, AND VEHICLE COMMUNICATION DEVICE

TECHNICAL FIELD

The present invention relates to image collection systems, image collection methods, image collection devices, recording media, and vehicle communication devices.

BACKGROUND ART

Conventionally, a technique on a navigation device has been known in which, when a vehicle reaches a position at a predetermined distance before an intersection to be guided during route guidance to a destination, a signboard installed in the vicinity of the intersection to be guided is used as a landmark to provide intersection guidance.

Also, Patent Document 1 below discloses a technique on a navigation device in which image data of a signboard or a sign in front of a vehicle, which is captured by an in-vehicle camera, is corrected to image data viewed from the front, so as to display the corrected image data on a display.

RELATED-ART DOCUMENTS

Patent Documents

[Patent Document 1] Japanese Laid-Open Patent Publication No. 2016-095688

SUMMARY OF THE INVENTION

Problem to be Solved by the Invention

Meanwhile, in order to perform intersection guidance or the like using a landmark object (a signboard, etc.) with a navigation device, it is necessary to recognize the landmark object in an image captured by, for example, an in-vehicle camera, and to save the image of the landmark object in advance in a database installed on a center.

However, conventionally, images of a landmark object captured by an in-vehicle camera are taken at various imaging angles; therefore, there has been a problem in that the precision of the landmark object recognized in the images varies image by image.

In order to solve the problem of the conventional technique described above, it is an object of the present invention to increase the precision of image recognition with respect to a landmark object in an image to be saved on a database.

Means to Solve the Problem

An image collection system according to one aspect of the present disclosure includes an image obtainment unit configured to obtain an image of a landmark object captured by an imaging unit installed on a vehicle; a positional relationship information obtainment unit configured to obtain positional relationship information representing a positional relationship between the landmark object and the vehicle when the image was captured; and a save processing unit configured to associate the image obtained by the image obtainment unit with the positional relationship information obtained by the positional relationship information obtainment unit, so as to save the associated image on a database.

According to the present configuration, an image captured by the imaging device can be saved on the database in a form such that the positional relationship between the landmark object and the vehicle when the image was captured can be identified. Thus, for example, when performing an image recognition process of a target object, the image recognition process of the target object can be performed with a certain precision by reading from the database only an image in which the landmark object and the vehicle have a specific positional relationship.

In the image collection system according to the one aspect of the present disclosure, the positional relationship information may include at least one of information representing a traveling lane on which the vehicle is traveling, and information representing an angle formed by the direction of the landmark object with respect to the traveling direction of the vehicle.

According to the present configuration, the image captured by the imaging device can be saved on the database in a form such that at least one of the traveling lanes on which the vehicle is traveling and the angle formed by the direction of the landmark object with respect to the traveling direction of the vehicle when the image was captured can be identified. This enables to perform the image recognition process of the target object with a certain precision, for example, by reading from the database only an image associated with a particular traveling lane or an image associated with a specific angle when performing the image recognition process of the target object.

In the image collection system according to the one aspect of the present disclosure, the system may further include an imaging position calculation unit configured to calculate, for each of the traveling lanes on the road on which the vehicle is traveling, an imaging position in the traveling direction of the vehicle at which the landmark object can be captured in an image from a predetermined angle; and an imaging control unit configured to perform imaging control for causing the imaging device to capture the image at the imaging position calculated by the imaging position calculation unit with respect to each of the traveling lanes. Here, the image obtainment unit may obtain multiple images captured by the imaging device controlled by the imaging control unit performing the imaging control at the imaging position calculated by the imaging position calculation unit with respect to each of the traveling lanes.

According to the present configuration, even if the vehicle is traveling on just one of the traveling lanes, it is possible to obtain an image of the landmark object captured from the predetermined angle. In other words, one of the multiple images captured by the imaging device can be used as an image in which the landmark object was captured from the predetermined angle. Also, according to the present configuration, the number of images to be captured (=the number of the traveling lanes) can be minimized; therefore, the communication capacity and the storage capacity related to the multiple captured images can be reduced.

In the image collection system according to the one aspect of the present disclosure, the positional relationship information obtainment unit may obtain, as the positional relationship information, the information representing the traveling lane on which the vehicle is traveling, by identifying the traveling lane on which the vehicle is traveling from among the multiple images obtained by the image obtainment unit. Then, the save processing unit prioritizes one of the multiple images obtained by the image obtainment unit, which was captured at the imaging position corresponding to the traveling lane on which the vehicle is traveling identified by the positional relationship information obtainment unit, so as to save the prioritized image on the database.

According to the present configuration, by a relatively simple image recognition process of identifying the traveling lane on which the vehicle is traveling, it is possible to identify a positional relationship between the landmark object and the vehicle when the image was captured. In addition, by prioritizing an image captured at the imaging position corresponding to the identified traveling lane to be saved on the database, it is possible in practice to prioritize the image in which the landmark object was captured from the predetermined angle, and to save the image on the database. Therefore, according to the present configuration, it is possible to increase the precision of image recognition with respect to the landmark object in an image to be saved on the database and to avoid a reduction in the utilization efficiency of the database storage area.

In the image collection system according to the one aspect of the present disclosure, the positional relationship information obtainment unit may obtain, as the positional relationship information, the information representing the traveling lane on which the vehicle is traveling, by identifying the traveling lane on which the vehicle is traveling from among the multiple images obtained by the image obtainment unit. Then, the save processing unit prioritizes one of the multiple images obtained by the image obtainment unit, which was captured at the imaging position corresponding to the traveling lane on which the vehicle is traveling identified by the positional relationship information obtainment unit, so as to save the prioritized image on the database.

According to the present configuration, even if the imaging direction of the signboard to be imaged is shifted from the predetermined angle due to a change in imaging conditions (e.g., GPS accuracy), it is possible in practice to prioritize an image captured from the predetermined angle, and to save the image on the database. Therefore, according to the present configuration, it is possible to increase the precision of image recognition with respect to the landmark object in the image to be saved on the database and avoid a reduction in the utilization efficiency of the database storage area.

In the image collection system according to the one aspect of the present disclosure, the image obtainment unit, the imaging position calculation unit, and the imaging control unit may be provided in an in-vehicle device installed in the vehicle; and the positional relationship information obtainment unit and the save processing unit may be provided in the center. The in-vehicle device may further include an image transmitter unit configured to transmit to the center the multiple images obtained by the image obtainment unit, and a lane change detection unit configured to detect a change in the traveling lane of the vehicle. Here, the image transmitter unit does not transmit to the center any of the multiple images captured by the imaging device, in the case where a change in the traveling lane has been detected by the lane change detection unit up until every one of the multiple images was captured by the imaging device at the imaging position.

Alternatively, in the image collection system according to the one aspect of the present disclosure, the system may include a lane change detection unit configured to detect a change in the traveling lane of the vehicle. Here, the save processing unit does not save any of the multiple images captured by the imaging devices on the database, in the case where a change in the traveling lane has been detected by the lane change detection unit up until every one of the multiple images was captured by the imaging device at the imaging position.

According to the present configuration, if the traveling lane on which the vehicle is traveling is changed, an image may be captured in a traveling lane that is different from an assumed traveling lane (i.e., an image captured with the imaging direction of the landmark object not at the predetermined angle). In such a case, it is possible to prevent the image captured with the imaging direction of the landmark object not at the predetermined angle, from being saved on the database.

Advantage of the Invention

It is possible to increase the precision of image recognition with respect to a landmark object in an image to be saved on a database.

MODE FOR CARRYING OUT THE INVENTION

In the following, with reference to the drawings, an image collection system according to embodiments of the present invention will be described.

(Functional Configuration of Image Collection System 10)

Figure 1:
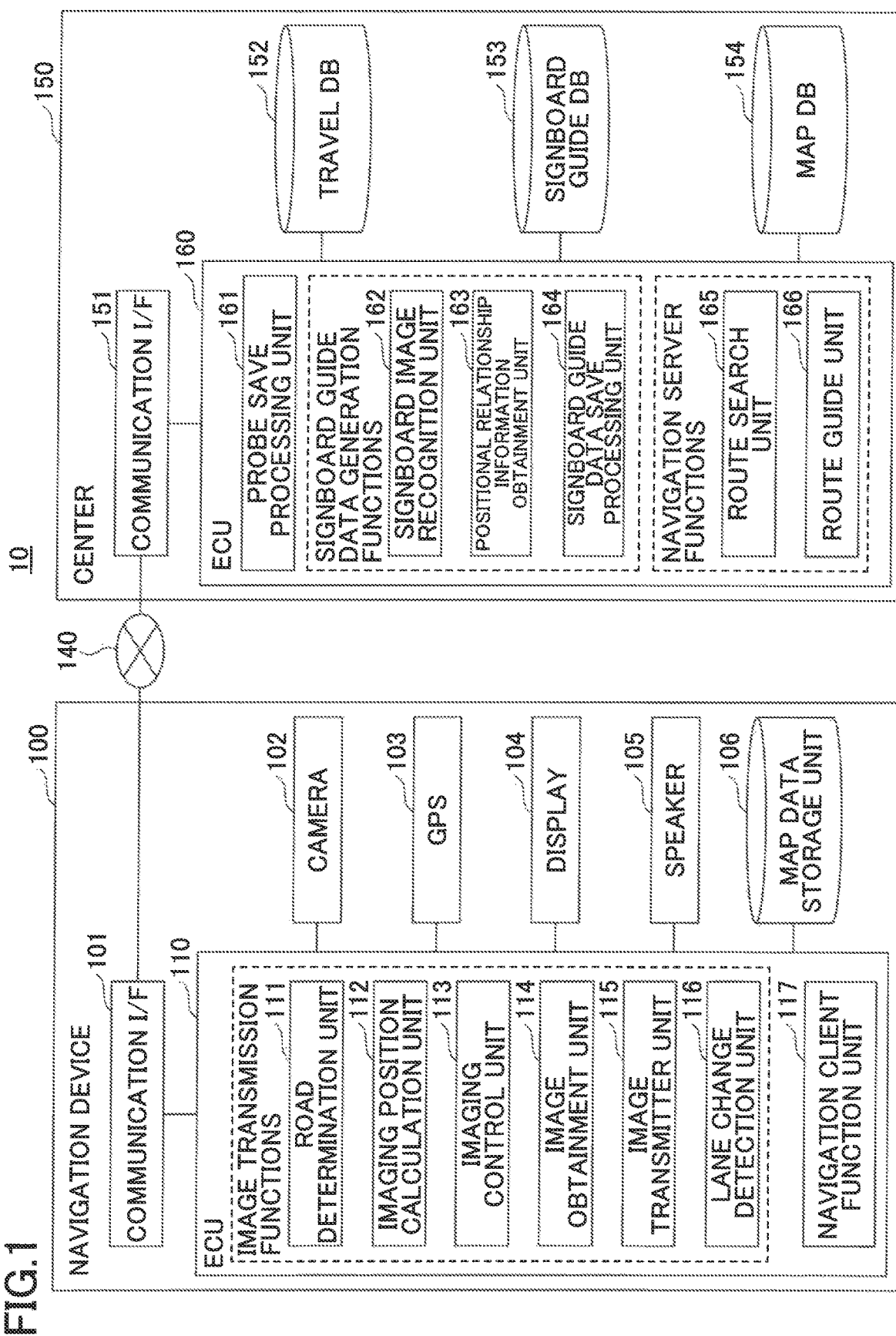
FIG. 1 is a diagram illustrating a functional configuration of an image collection system according to an embodiment.

FIG. 1 is a diagram illustrating a functional configuration of an image collection system 10 according to an embodiment. The image collection system 10 illustrated in FIG. 1 is configured to include a center 150 and a navigation device 100, and various information items and various services can be provided from the center 150 to the navigation device 100 through a network 140.

Also, the image collection system 10 transmits an image of a signboard as a landmark object, which is captured by a camera 102 installed on the vehicle, from the navigation device 100 to the center 150. At the center 150, based on multiple images collected from the navigation device 100, a signboard guide DB (database) 153 can be constructed.

Note that although FIG. 1 illustrates one navigation device 100, in practice, the image collection system 10 may be constituted with multiple navigation devices 100 (any one of these has substantially the same configuration as the navigation device 100 illustrated in FIG. 1). In other words, the center 150 can provide various information items and various services to the multiple navigation devices 100, and can collect images from the multiple navigation devices 100.

(Center 150)

The center 150 is an example of an "image collection device", which is a device installed in a facility (e.g., a facility managed by a service provider) outside the vehicles. The center 150 is connected to the network 140. As the network 140, for example, the Internet, public radio links, and the like may be listed. The center 150 can provide various services (e.g., server functions of a navigation system, etc.) to the navigation device 100 via the network 140.

As illustrated in FIG. 1, the center 150 includes a communication I/F (interface) 151, a travel DB 152, a signboard guide DB 153, a map DB 154, and an ECU 160.

The communication I/F 151 transmits and receives various items of data with the navigation device 100 by controlling communication with the navigation device 100 via the network 140.

The travel DB 152 stores probe data transmitted from the navigation device 100. The probe data includes, for example, multiple images captured by the camera 102 on the traveling lanes; information for identifying a signboard to be imaged (e.g., ID, positional information, etc.); and positional information on imaging positions of the images.

The signboard guide DB 153 is an example of a "database". The signboard guide DB 153 stores multiple items of signboard guidance data. Here, "signboard guidance data" is assumed to include data required to perform intersection guidance using a signboard as a landmark for an intersection, with which the intersection guidance can be performed. For example, an item of the signboard guidance data includes a name (e.g., a store name), positional information (longitude and latitude), an image, and the like of the signboard.

The map DB 154 stores map data. The map data includes multiple items of node data and multiple items of link data. A node data item corresponds to an intersection. A link data item corresponds to a road section between nodes.

The ECU 160 is a device to control the entire center 150. As illustrated in FIG. 1, the ECU 160 includes a probe save processing unit 161. The ECU 160 also includes, as functions for generating signboard guidance data, a signboard image recognition unit 162, a positional relationship information obtainment unit 163, and a signboard guide data save processing unit 164. The ECU 160 also includes, as functions of a navigation server, a route search unit 165 and a route guide unit 166.

In response to receiving probe data transmitted from the navigation device 100 via the communication I/F 151, the probe save processing unit 161 saves the probe data on the travel DB 152. The probe data transmitted from the navigation device 100 includes at least one or more images captured on the traveling lanes by the camera 102, information for identifying the signboard to be imaged (e.g., ID, positional information, etc.), and positional information on the imaging positions of the images.

Once the probe data has been saved on the travel DB 152, the signboard image recognition unit 162 performs a publicly-known image recognition process with multiple images included in the probe data, to recognize a signboard.

For each of the multiple images included in the probe data, the positional relationship information obtainment unit 163 identifies a positional relationship between the signboard recognized by the signboard image recognition unit 162 and the vehicle, so as to obtain positional relationship information representing the positional relationship. In the present embodiment, the positional relationship information obtainment unit 163 performs the image recognition process with respect to the multiple images included in the probe data to identify the traveling lane on which the vehicle is traveling, so as to obtain the positional relationship information representing the traveling lane on which the vehicle is traveling, as the positional relationship information representing the positional relationship between the signboard recognized by the signboard image recognition unit 162 and the vehicle. As the method of identifying a traveling lane in an image, any publicly-known method can be used; for example, the method may identify multiple traveling lanes by recognizing multiple white lines in the image, and based on the relationship between the display positions of the multiple traveling lanes in the image and the position of the camera on the vehicle, the method can identify the traveling lane on which the vehicle is traveling. For example, in the case where the camera is installed at the center in the lateral direction of the vehicle, a traveling lane that is displayed at the center in the lateral direction of the image can be identified as the traveling lane on which the vehicle is traveling.

Figure 4:
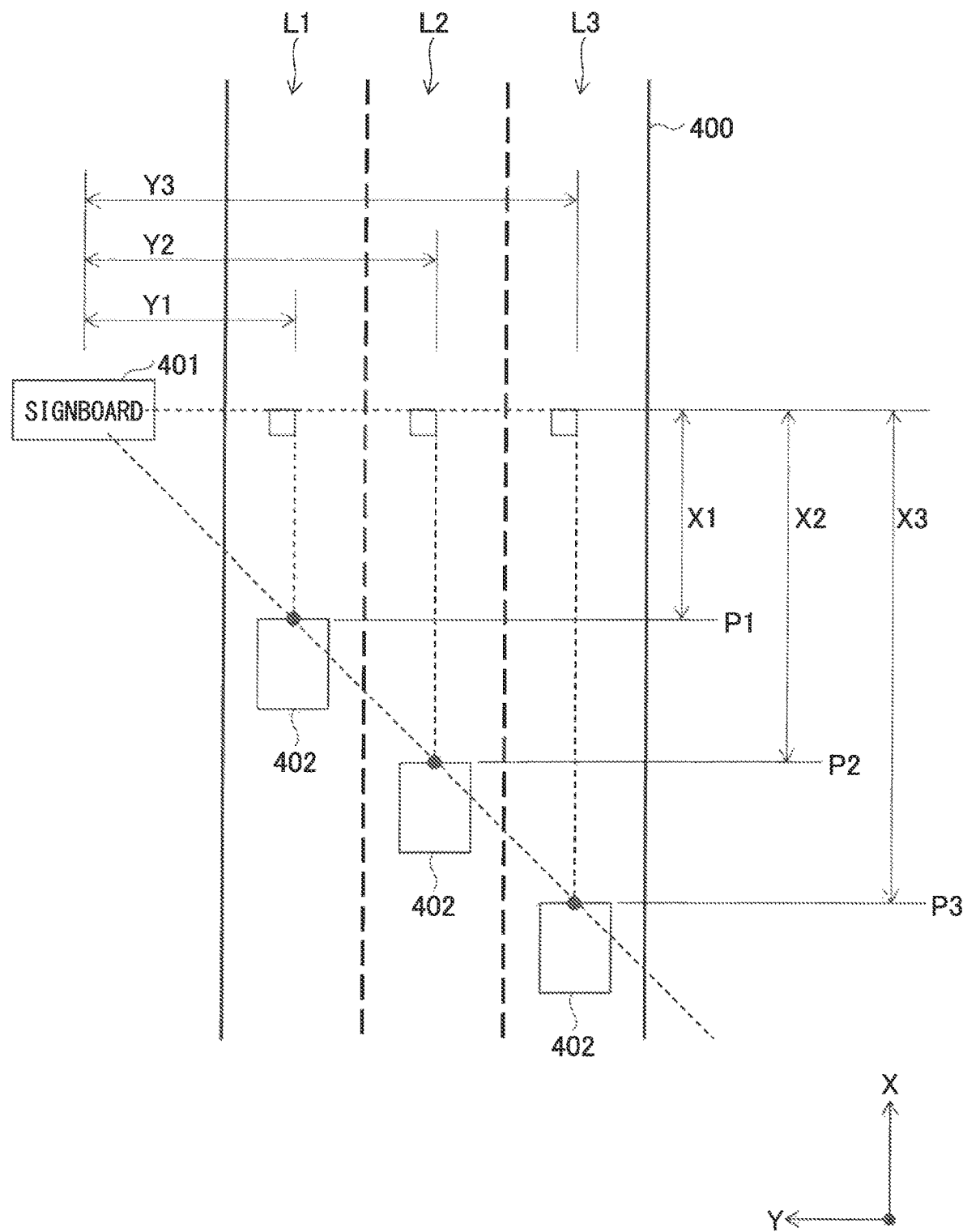
FIG. 4 is a diagram for describing an example of an imaging position for each traveling lane calculated by a navigation device (ECU) according to an embodiment.

Based on the positional relationship information obtained by the positional relationship information obtainment unit 163, from among the multiple images included in the probe data, the signboard guide data save processing unit 164 extracts an image in which a signboard to be imaged (a signboard recognized by the signboard image recognition unit 162) is captured from a predetermined angle, and then, saves the image on the signboard guide DB 153. In the present embodiment, the signboard guide data save processing unit 164 prioritizes an image captured at the imaging position corresponding to the traveling lane identified by the positional relationship information obtainment unit 163, and saves the image on the signboard guide DB 153 from among the multiple images included in the probe data. For example, as illustrated in FIG. 4, in the case where a road 400 on which a vehicle 402 is traveling has three traveling lanes L1, L2, and L3, the probe data includes images captured on the three traveling lanes L1, L2, and L3. Here, suppose that the positional relationship information obtainment unit 163 identifies that the vehicle 402 is traveling on the second traveling lane L2. Among the multiple images included in the probe data, an image captured at the imaging position corresponding to the second traveling lane L2 is an image captured with the imaging direction of the signboard to be imaged at a predetermined angle (e.g., 45 degrees) while the vehicle 402 is traveling on the second traveling lane L2. On the other hand, among the multiple images included in the probe data, images captured at the imaging positions corresponding to the first traveling lane L1 and the third traveling lane L3 are images in which the imaging direction of the signboard to be imaged is not at the predetermined angle while the vehicle 402 is traveling on the second traveling lane L2. Thereupon, in this case, among the multiple images included in the probe data, the signboard guide data save processing unit 164 prioritizes the image captured at the imaging position corresponding to the second traveling lane L2, and saves the image on the signboard guide DB 153. On the other hand, among the multiple images included in the probe data, the signboard guide data save processing unit 164 does not save the images captured at the imaging positions corresponding to the first traveling lane L1 and the third traveling lane L3 on the signboard guide DB 153. Thus, the image in which the imaging direction of the signboard to be imaged corresponds to the predetermined angle (e.g., 45 degrees) is prioritized to be saved on the signboard guide DB 153.

In response to receiving a route search request from the navigation device 100, based on the map data stored in the map DB 154, the route search unit 165 searches for a route from the current position of the navigation device 100 identified by current positional relationship information included in the route search request, to a destination identified by destination information included in the route search request. A route searched by the route search unit 165 includes a sequence of links constituting the route to the destination and intersection guidance data of each intersection on the route. Here, for an intersection toward which the intersection guidance can be performed using a signboard installed in the vicinity as a landmark, the intersection guidance data includes signboard guidance data obtained from the signboard guide DB 153 (e.g., a name (e.g., a store name), positional information (longitude and latitude), an image, and the like of the signboard).

The route guide unit 166 performs route guidance from the starting point to the destination point of the route based on the route searched by the route search unit 165. The route guidance performed by the route guide unit 166 involves displaying a route guidance screen on the display 104 provided on the navigation device 100, and outputting route guidance voices from the speaker 105 provided on the navigation device 100. Here, for an intersection of which signboard guidance data is included on the route searched by the route search unit 165, the route guide unit 166 performs intersection guidance using a signboard as a landmark based on the signboard guidance data (e.g., "If you see a signboard of OO, turn to the left", etc.). At this time, the route guide unit 166 causes the display 104 to display an image included in the signboard guidance data (i.e., an image of the signboard obtained from the signboard guide DB 153). This enables the driver of the vehicle to easily grasp which signboard can be used as the landmark from the image displayed on the display 104.

Note that the ECU 160 is configured to include hardware elements such as a CPU (Central Processing Unit), a main memory device (e.g., a ROM (Read-Only Memory), a RAM (Random Access Memory), etc.), an auxiliary storage device (e.g., an HDD (Hard Disk Drive), a flash memory, etc.), and the like. The functions of the ECU 160 illustrated in FIG. 1 are implemented, for example, by causing the CPU (a computer) to execute a program stored in the main memory device or the auxiliary storage device on the ECU 160.

A program executed by the CPU may be provided in a state of being installed on the ECU 160 in advance, or may be provided externally to be installed on the ECU 160. In the latter case, the program may be provided with a computer-readable recording medium (e.g., a USB memory, memory card, CD-ROM, etc.) or may be provided by downloading from a server on a network (e.g., the Internet, etc.).

Also, the center 150 may be physically constituted with a single unit of an information processing apparatus (e.g., a server device) or may be physically constituted with multiple units of information processing apparatuses. In the latter case, the multiple information processing apparatuses may be connected with each other via a network.

(Navigation Device 100)

The navigation device 100 is an example of an "in-vehicle device", which is a device installed on a vehicle such as an automobile. The navigation device 100 can use various services provided by the center 150 (e.g., server functions of the navigation system, etc.) via the network 140.

As illustrated in FIG. 1, the navigation device 100 includes a communication I/F 101, a camera 102, a GPS (Global Positioning System) 103, a display 104, a speaker 105, a map data storage unit 106, and an ECU 110.

The communication I/F 101 controls communication with the center 150 via the network 140, to transmit and receive various items of data with the center 150. As the communication I/F 101, for example, a communication I/F for a DCM (Data Communication Module) may be used. The camera 102 is an example of an "imaging device". The camera 102 captures an image with an imaging direction toward the front of the vehicle, covering a predetermined angle of field (at least twice a "predetermined angle", which will be described later). The GPS (Global Positioning System) 103 detects the current position (longitude and latitude) of the vehicle, based on GPS signals received from the GPS satellites.

The display 104 is a device to display various information items (e.g., a map screen, a route guidance screen, etc.). As the display 104, for example, a liquid crystal display, an organic EL display, and the like may be listed. The speaker 105 outputs various sounds (e.g., route guidance voices, etc.).

The map data storage unit 106 stores map data. For example, the map data storage unit 106 saves map data provided by the center 150. This enables, with respect to a map screen once displayed, the map data storage unit 106 to redisplay the map screen based on the map data saved on the map data storage unit 106. Therefore, it is possible to control the frequency of communication with the map data storage unit 106, and hence, to obtain an effect such as improvements on the display speed of the map screen.

The ECU 110 is a device to control the entire navigation device 100. As illustrated in FIG. 1, the ECU 110 includes, as functions for transmitting an image, a road determination unit 111, an imaging position calculation unit 112, an imaging control unit 113, an image obtainment unit 114, an image transmitter unit 115, and a lane change detection unit 116. The ECU 110 also includes a navigation client function unit 117.

The road determination unit 111 determines whether the vehicle is traveling or not on a predetermined road. In the present embodiment, the "predetermined road" is a road that satisfies the following four conditions:

(1) In the traveling direction of the vehicle, the road is located within a predetermined distance range from the signboard to be imaged.

(2) In a direction orthogonal to the traveling direction of the vehicle, the road is located within a predetermined distance range from the signboard to be imaged.

(3) The road has multiple traveling lanes.

(4) The road has a curvature less than or equal to a predetermined value (generally a straight road).

The conditions (1) and (2) described above can be determined, for example, based on the positional information on the signboard to be imaged and information representing the current position of the vehicle detected by the GPS 103. Also, the conditions (3) and (4) described above can be determined, for example, based on the link data of the road on which the vehicle is traveling stored in the map data storage unit 106.

For each of the multiple traveling lanes on the road on which the vehicle is traveling, the imaging position calculation unit 112 calculates the imaging position in the traveling direction of the vehicle, at which the signboard to be imaged can be imaged from the predetermined angle. For example, with notations of X denoting the distance from the position of the signboard to be imaged in the traveling direction of the vehicle, to the imaging position; Y denoting the distance from the position of the signboard to be imaged in the direction orthogonal to the traveling direction of the vehicle, to the imaging position; and θ denoting the predetermined angle, as the distance Y and the predetermined angle θ are fixed, the imaging position calculation unit 112 may simply calculate the distance X based on the following equation (1):

$$\tan \theta = X/Y \qquad (1)$$

For example, as illustrated in FIG. 4, in the case where the road 400 on which the vehicle 402 is traveling has the three traveling lanes L1, L2, and L3; the predetermined angle θ is set to 45 degrees; and the distance Y1 from the position of the first traveling lane L1 to the signboard 401 in the direction orthogonal (the Y-axis direction in the figure) to the traveling direction of the vehicle 402 is 30 m, the distance X1 from the imaging position P1 to the position of the signboard 401 in the traveling direction of the vehicle 402 (the X-axis direction in the figure) is 30 m.

Similarly, in the case where the distance Y2 from the position of the second traveling lane L2 to the signboard 401 in the direction orthogonal to the traveling direction of the vehicle 402 is 35 m, the distance X2 from the imaging position P2 to the position of the signboard 401 in the traveling direction of the vehicle 402 is 35 m.

Further similarly, in the case where the distance Y3 from the position of the third traveling lane L3 to the signboard 401 in the direction orthogonal to the traveling direction of the vehicle 402 is 40 m, the distance X3 from the imaging position P3 to the position of the signboard 401 in the traveling direction of the vehicle. 402 is 40 m.

At each of the multiple imaging positions on the respective traveling lanes calculated by the imaging position calculation unit 112, the imaging control unit 113 performs imaging control to cause the camera 102 to capture an image of the signboard to be imaged.

The image obtainment unit 114 obtains an image captured by the camera 102 installed on the vehicle (an image captured for each traveling lane), and every time having obtained one image, temporarily stores the one image in the memory provided in the navigation device 100.

The lane change detection unit 116 detects a change in the traveling lane of the vehicle. The lane change detection unit 116 can detect a change in the traveling lane of the vehicle, for example, based on a steering angle signal of the steering of the vehicle, a lane deviation detection signal generated by a lane deviation detection system installed on the vehicle, and the like. Also, the lane change detection unit 116 can detect a change in the traveling lane of the vehicle, for example, from an image in front of the vehicle captured by the camera 102 installed on the vehicle, based on a result of the image recognition of white lines on the road that separate the traveling lanes.

Once capturing of the images for all traveling lanes by the camera 102 has been completed, the image transmitter unit 115 reads the images for all traveling lanes from the memory and transmits the images to the center 150 through the communication I/F 101. However, if a change in the traveling lane has been detected by the lane change detection unit 116 up until the images for all traveling lanes were captured by the camera 102, the image transmitter unit 115 does not transmit any of the images captured by the camera 102 to the center 150.

The navigation client function unit 117 implements client functions in the navigation system. For example, by requesting to the center 150 to perform route search and route guidance to a destination, the navigation client function unit 117 can cause the center 150 to perform the route search and route guidance. Then, according to the guidance of a route to the destination provided by the center 150, the navigation client function unit 117 displays a map screen or a route guidance screen on the display 104 and outputs route guidance voices from the speaker 105.

Note that the ECU 110 is configured to include hardware elements such as a CPU (Central Processing Unit), a main memory device (e.g., a ROM (Read-Only Memory), a RAM (Random Access Memory), etc.), an auxiliary storage device (e.g., an HDD (hard disk drive), a flash memory, etc.), and the like. The functions of the ECU 110 illustrated in FIG. 1 are implemented, for example, by causing the CPU (a computer) to execute a program stored in the main memory or the auxiliary storage device on the ECU 110.

(Processing Steps by the Navigation Device 100)

Figure 2:
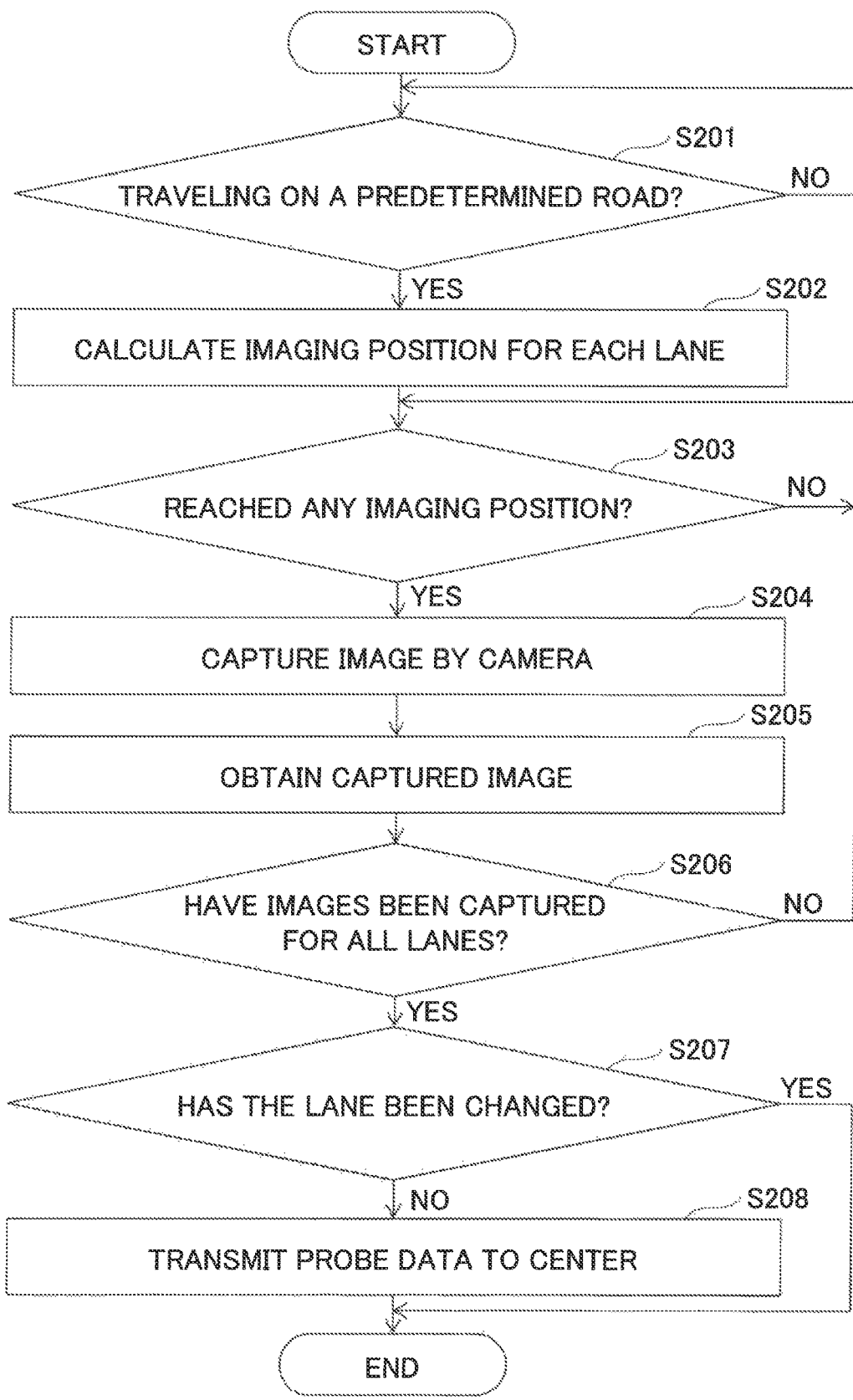
FIG. 2 is a flow chart illustrating an example of processing steps performed by a navigation device (ECU) according to an embodiment.

FIG. 2 is a flow chart illustrating an example of processing steps performed by the navigation device 100 (ECU 110) according to the embodiment. The processing steps in FIG. 2 are performed by the ECU 110, for example, every time the vehicle reaches a position at a predetermined distance before a signboard to be imaged while the vehicle is traveling.

For example, the navigation device 100 obtains in advance a list of multiple signboards to be imaged from the center 150. The list includes positional information for each of the multiple signboards to be imaged. Based on the positional information of each of the multiple signboards to be imaged and the current positional information of the vehicle, the ECU 110 determines whether the vehicle has reached a position at the predetermined distance before one of the signboards to be imaged. Then, if having determined that the vehicle has reached a position at the predetermined distance before one of the signboards to be imaged, the ECU 110 performs the following processing steps to obtain an image of the signboard.

First, at Step S201, the road determination unit 111 determines whether or not the vehicle is traveling on a predetermined road. If having determined at Step S201 that the vehicle is not traveling on a predetermined road (NO at Step S201), the road determination unit 111 executes the processing of Step S201 again.

On the other hand, if having determined at Step S201 that the vehicle is traveling on a predetermined road (YES at Step S201), for each of the multiple traveling lanes on the road on which the vehicle is traveling, at Step S202, the imaging position calculation unit 112 calculates a position in the traveling direction of the vehicle at which the signboard to be imaged can be imaged from the predetermined angle, as the imaging position P. For example, as illustrated in FIG. 4, in the case where the road 400 on which the vehicle 402 is traveling has the three traveling lanes L1, L2, and L3, the imaging position calculation unit 112 calculates three imaging positions P1, P2, and P3 corresponding to these three traveling lanes L1, L2, and L3.

Thereafter, at Step S203, the imaging control unit 113 determines whether or not the vehicle has reached one of the imaging positions calculated at Step S202. For example, in the case where three imaging positions P1, P2, and P3 have been calculated at Step S202, the imaging control unit 113 determines whether or not the vehicle 402 has reached one of these three imaging positions P1, P2, and P3. This determination can be based on the positional information on the imaging positions and the positional information on the current position of the vehicle 402. If having determined at Step S203 that the vehicle has not reached any of the imaging positions (NO at Step S203), the imaging control unit 113 executes the processing of Step S203 again.

On the other hand, if having determined at Step S203 that the vehicle has reached one of the imaging positions (YES at Step S203), at Step S204, the imaging control unit 113 causes the camera 102 to capture an image of the signboard to be imaged. Then, at Step S205, the image obtainment unit 114 obtains an image captured at Step S204 and temporarily stores the image in a memory provided in the navigation device 100. Steps S203 to S205 are executed repeatedly, and images at the multiple imaging positions calculated at Step S202 are stored in the memory. For example, in the case where three imaging positions P1, P2, and P3 are calculated at Step S202, Steps S203 to S205 are repeated three times, to store the images at these three imaging positions P1, P2, and P3 in the memory.

Thereafter, at Step S206, the imaging control unit 113 determines whether or not images have been captured at all imaging positions calculated at Step S202. If having determined at Step S206 that images have not yet been captured at all imaging positions (NO at Step S206), the ECU 110 causes the processing to return to Step S203.

On the other hand, if having determined at Step S206 that images have been captured at all imaging positions (YES at Step S206), at Step S207, the image transmitter unit 115 determines whether or not a change in the traveling lane has been detected by the lane change detection unit 116 up until the images for all traveling lanes were captured by the camera 102.

If having determined at Step S207 that a change in the traveling lane has been detected (YES at Step S207), the ECU 110 discards all images captured by the camera 102 up until then from the memory and ends the series of processing steps illustrated in FIG. 2. If the traveling lane on which the vehicle is traveling has been changed, there is a likelihood that an image has been captured with the imaging direction of the landmark object that does not correspond to the predetermined angle. Thereupon, if the traveling lane on which the vehicle is traveling has been changed, the ECU 110 discards all images captured by the camera 102 from the memory. This prevents an image captured with the imaging direction of the landmark object that does not correspond to the predetermined angle, from being saved on the database.

On the other hand, if having determined at Step S207 that a change in the traveling lane has not been detected (NO at Step S207), at Step S208, the image transmitter unit 115 reads the images for all traveling lanes from the memory and transmits probe data including these images to the center 150 through the communication I/F 101. Then, the ECU 110 ends the series of processing steps illustrated in FIG. 2.

(Example of Processing Steps by the Center 150)

Figure 3:
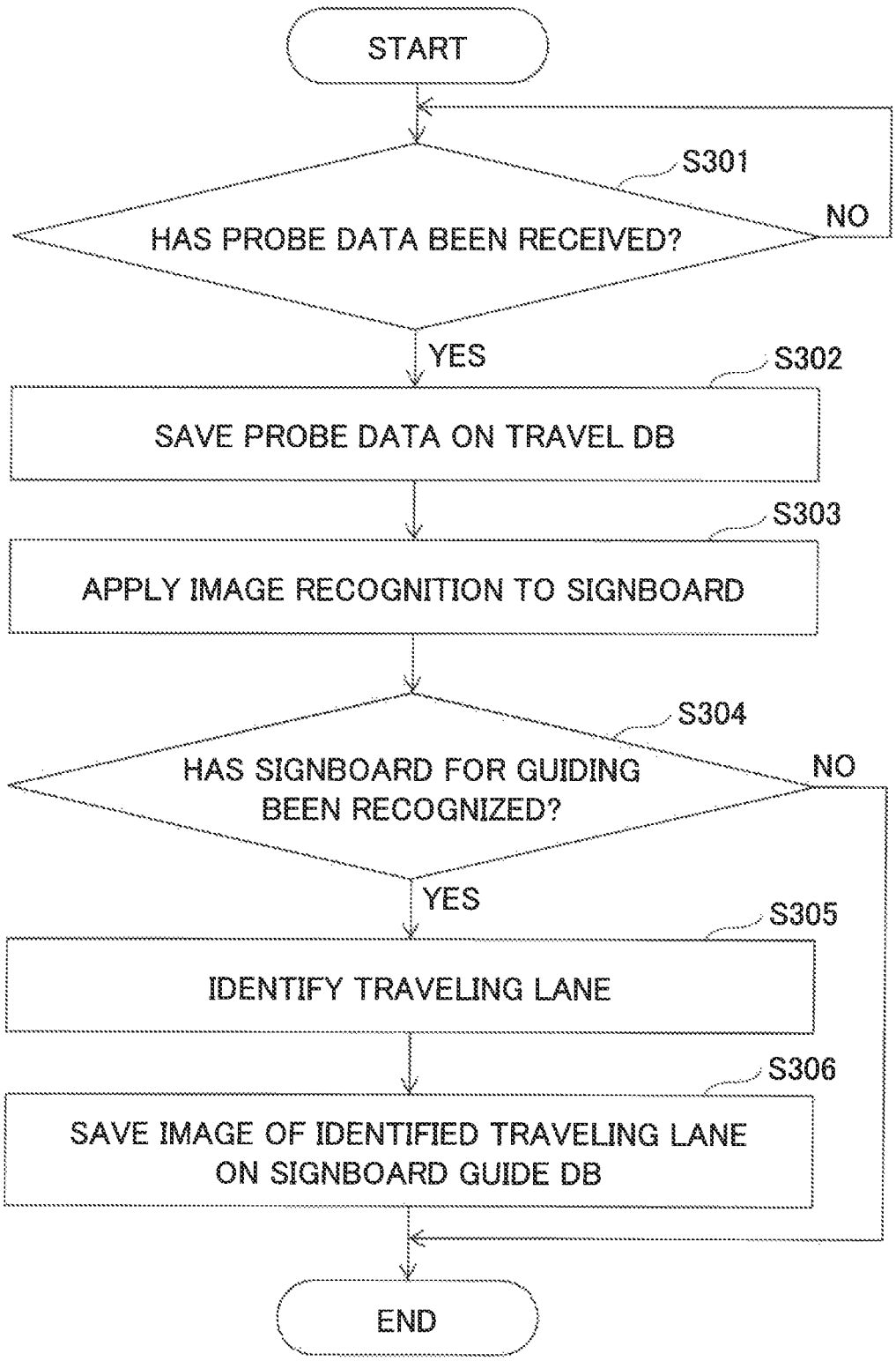
FIG. 3 is a flow chart illustrating an example of processing steps performed by a center (ECU) according to an embodiment.

FIG. 3 is a flow chart illustrating an example of processing steps performed by the center 150 (ECU 160) according to the embodiment. The processing steps in FIG. 3 are repeatedly executed by the ECU 160, for example, while the center 150 is in operation.

First, at Step S301, the probe save processing unit 161 determines whether or not probe data transmitted from the navigation device 100 has been received. If having determined at Step S301 that the probe data has not been received (NO at Step S301), the probe save processing unit 161 executes the processing of Step S301 again.

On the other hand, if having determined at Step S301 that the probe data has been received (YES at Step S301), the probe save processing unit 161 saves the probe data on the travel DB 152 (Step S302).

Next, at Step S303, the signboard image recognition unit 162 performs a publicly-known image recognition process to recognize a signboard to be imaged in multiple images included in the probe data saved on the travel DB 152 at Step S302. Then, at Step S304, the signboard image recognition unit 162 determines whether or not the signboard for guiding the intersection has been recognized in the image by the image recognition process at Step S303. For example, the ECU 160 holds a list of signboards subject to the intersection guidance in the memory in advance. If the signboard recognized by the image at Step S303 is included in this list, the signboard image recognition unit 162 determines that "the signboard for guiding the intersection has been recognized in the image".

If having determined at Step S304 that no signboard for guiding the intersection is recognized in the images (NO at Step S304), the ECU 160 ends the series of processing steps illustrated in FIG. 3.

On the other hand, if having determined at Step S304 that the signboard for guiding the intersection has been recognized in the images (YES at Step S304), the positional relationship information obtainment unit 163 identifies a traveling lane on which the vehicle is traveling based on the multiple images included in the probe data (Step S305). For example, as illustrated in FIG. 4, in the case where the road 400 on which the vehicle 402 is traveling has the three traveling lanes L1, L2, and L3, from among these three traveling lanes L1, L2, and L3, a traveling lane on which the vehicle 402 is traveling is identified.

Then, the signboard guide data save processing unit 164 prioritizes an image captured at the imaging position corresponding to the traveling lane identified at Step S305, and saves the image on the signboard guide DB 153 from among the multiple images included in the probe data. For example, if the traveling lane on which the vehicle 402 is traveling is identified as the traveling lane L2, the signboard guide data save processing unit 164 extracts an image captured at the imaging position P2 corresponding to the traveling lane L2 from among the multiple images included in the probe data, and prioritizes the image to be saved on the signboard guide DB 153. Thereafter, the ECU 160 ends the series of processing steps illustrated in FIG. 3.

In this way, the ECU 160 identifies the traveling lane on which the vehicle is traveling to save the captured image at the imaging position corresponding to the traveling lane on the signboard guide DB 153; this enables to prioritize an image captured with the imaging direction of the signboard to be imaged at a predetermined angle (e.g., 45 degrees), to be saved on the signboard guide DB 153.

(Example of Imaging Positions on Traveling Lanes)

FIG. 4 is a diagram for illustrating an example of imaging positions for respective traveling lanes calculated by the navigation device 100 (ECU 110) according to the embodiment. The road 400 illustrated in FIG. 4 is a three-lane straight road with the traveling lanes L1, L2 and L3. Here, an example will be described where images are captured with the imaging direction of the signboard 401 at 45 degrees in the respective traveling lanes.

For example, in the example in FIG. 4, in the case where the distance Y1 from the first traveling lane L1 to the position of the signboard 401 in the direction orthogonal (Y-axis direction in the figure) to the traveling direction of the vehicle 402 (X-axis direction in the figure) is 30 m, the imaging position calculation unit 112 sets a position located 30 m before the signboard 401 in the traveling direction of the vehicle 402 (X-axis direction in the figure) as the imaging position P1. This imaging position P1 is a position at which the imaging direction of the signboard 401 becomes 45 degrees on the first traveling lane L1.

Also, in the example in FIG. 4, in the case where the distance Y2 from the second traveling lane L2 to the position of the signboard 401 in the direction orthogonal to the traveling direction of the vehicle 402 is 35 m, the imaging position calculation unit 112 sets a position located 35 m before the signboard 401 in the traveling direction of the vehicle 402 as the imaging position P2. This imaging position P2 is a position at which the imaging direction of the signboard 401 becomes 45 degrees on the second traveling lane L2.

Also, in the example in FIG. 4, in the case where the distance Y3 from the third traveling lane L3 to the position of the signboard 401 in the direction orthogonal to the traveling direction of the vehicle 402 is 40 m, the imaging position calculation unit 112 sets a position located 40 m before the signboard 401 in the traveling direction of the vehicle 402 as the imaging position P3. This imaging position P3 is a position at which the imaging direction of the signboard 401 becomes 45 degrees on the third traveling lane L3.

The imaging control unit 113 causes the camera 102 to capture images of the signboard 401 at the multiple imaging positions P1, P2, and P3 calculated by the imaging position calculation unit 112. If the vehicle 402 is traveling on the first traveling lane L1, then, the image captured at the imaging position P1 is an image captured with the imaging direction of the signboard 401 at 45 degrees. Alternatively, if the vehicle 402 is traveling on the second traveling lane L2, then, the image captured at the imaging position P2 is an image captured with the imaging direction of the signboard 401 at 45 degrees. Alternatively, if the vehicle 402 is traveling on the third traveling lane L3, then, the image captured at the imaging position P3 is an image captured with the imaging direction of the signboard 401 at 45 degrees. In other words, by capturing images at the respective imaging positions P1, P2, and P3, even if the vehicle 402 is traveling on just one of the traveling lanes, it is possible to capture an image of the signboard 401 that is captured from a predetermined angle (45 degrees).

(Examples of Images Captured for Respective Traveling Lanes)

Figure 5A:
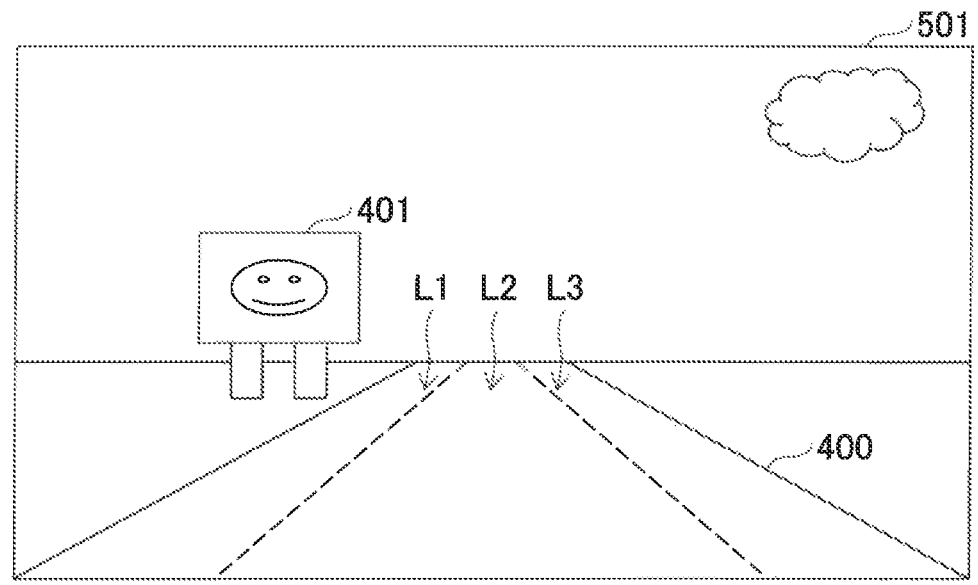
FIG. 5A illustrates an example of an image captured for each traveling lane by a camera according to an embodiment.

FIG. 5 includes diagrams illustrating examples of images captured by the camera 102 for respective traveling lanes according to the embodiment. An image 501 illustrated in FIG. 5A is an example of an image captured by the camera 102 installed on the vehicle captured at the imaging position P3 that is located 40 m before the signboard 401 while the vehicle 402 is traveling on the second traveling lane L2 of the road 400.

Figure 5B:
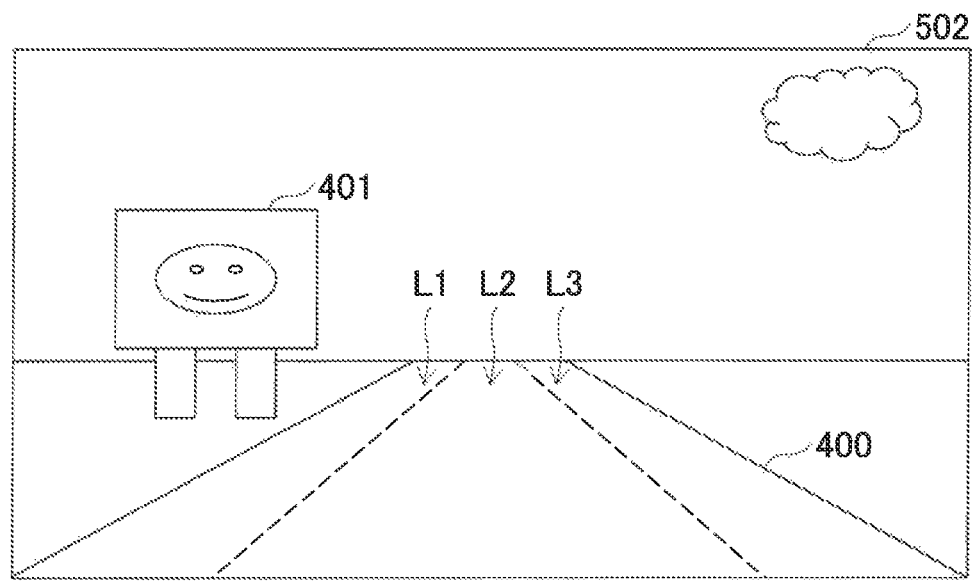
FIG. 5B illustrates an example of an image captured for each traveling lane by a camera according to an embodiment.

Also, an image 502 illustrated in FIG. 5B is an example of an image captured by the camera 102 installed on the vehicle captured at the imaging position P2 that is located 35 m before the signboard 401 while the vehicle 402 is traveling on the second traveling lane L2 of the road 400.

Figure 5C:
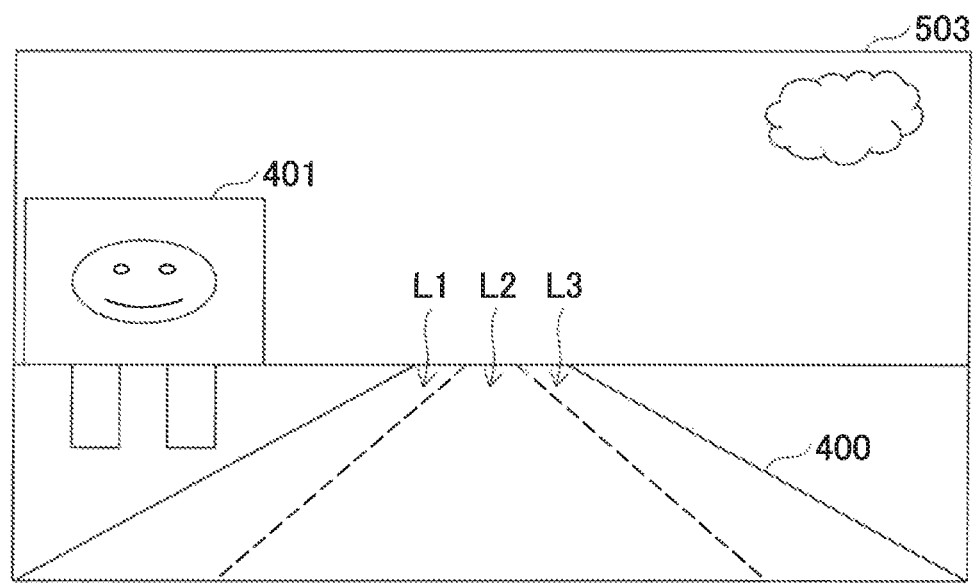
FIG. 5C illustrates an example of an image captured for each traveling lane by a camera according to an embodiment.

Also, an image 503 illustrated in FIG. 5C is an example of an image captured by the camera 102 installed on the vehicle captured at the imaging position P1 that is located 30 m before the signboard 401 while the vehicle 402 is traveling on the second traveling lane L2 of the road 400.

Here, as illustrated in FIG. 4, if the vehicle 402 is traveling on the second traveling lane L2, then, the image captured at the imaging position P2 is an image captured with the imaging direction of the signboard 401 at 45 degrees. Therefore, the image 502 illustrated in FIG. 5B is prioritized to be saved on the signboard guide DB 153 because the imaging direction of the signboard 401 corresponds to 45 degrees.

On the other hand, the image 501 illustrated in FIG. 5A is not saved on the signboard guide DB 153 because the imaging direction of the signboard 401 is narrower than 45 degrees. Similarly, the image 503 illustrated in FIG. 5C is not saved on the signboard guide DB 153 because the imaging direction of the signboard 401 is wider than 45 degrees.

In this way, the ECU 160 identifies the traveling lane on which the vehicle is traveling to save the captured image at the imaging position corresponding to the traveling lane on the signboard guide DB 153; this enables to always prioritize an image captured with the imaging direction of the signboard to be imaged at a predetermined angle (e.g., 45 degrees), and to save the image on the signboard guide DB 153.

As described above, according to the image collection system 10 of the present embodiment, from among multiple images captured by the camera 102 installed on the vehicle, an image in which a signboard to be imaged is captured from a predetermined angle is prioritized to be saved on the signboard guide DB 153 provided in the center 150. This enables to obtain a relatively high precision of the signboard that is uniform among multiple images saved on the signboard guide DB 153. This also enables to prevent images with relatively low precision from being wastefully saved on the signboard guide DB 153. Therefore, according to the present configuration, it is possible to increase the precision of the signboard in an image to be saved on the signboard guide DB 153, and to avoid a reduction in the utilization efficiency of the storage area of the signboard guide DB 153.

Also, according to the image collection system 10 of the present embodiment, for each of multiple traveling lanes on a road on which the vehicle is traveling, it is possible to obtain an image in which a signboard to be imaged is captured from a predetermined angle. Therefore, in the case where it is not possible on the vehicle side to identify the traveling lane, even if the vehicle is traveling on just one of the traveling lanes, the center 150 can obtain an image in which the signboard to be imaged is captured from the predetermined angle. Also, according to the present configuration, it is possible to minimize the number of images to be captured (the number of traveling lanes); therefore, it is possible to reduce the communication capacity and the storage capacity related to the multiple captured images.

Also, according to the image collection system 10 of the present embodiment, if a change in the traveling lane of the vehicle has been detected up until images were captured by the camera 102 at all the imaging positions, none of the images captured by the camera 102 is transmitted to the center 150. According to the present configuration, if the traveling lane on which the vehicle is traveling is changed, an image may be captured in a traveling lane that is different from an assumed traveling lane (i.e., an image captured with the imaging direction of the signboard to be imaged not at the predetermined angle). In such a case, it is possible to prevent the image captured with the imaging direction of the signboard to be imaged not at the predetermined angle, from being saved on the signboard guide DB 153.

Also, according to the image collection system 10 of the present embodiment, it is possible to identify the traveling lane on which the vehicle is traveling from an image, as a positional relationship between the signboard and the vehicle when the image of the signboard to be imaged is captured. Therefore, according to the present configuration, by a relatively simple image recognition process of identifying the traveling lane on which the vehicle is traveling, it is possible to identify a positional relationship between the landmark object and the vehicle when the image was captured.

(Modified Example of Processing Steps by the Center 150)

Figure 6:
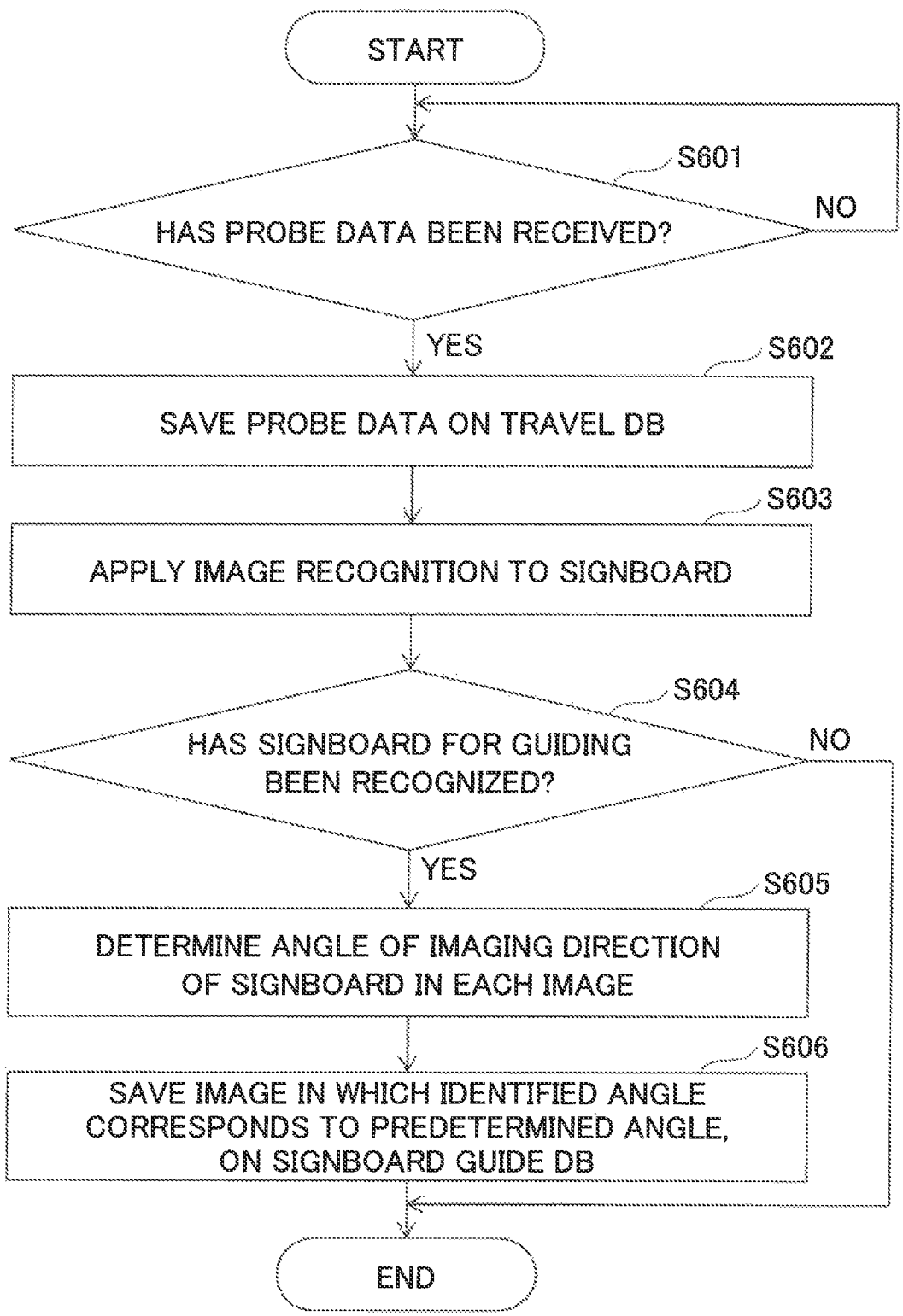
FIG. 6 is a flow chart illustrating a modified example of processing steps performed by a center (ECU) according to an embodiment.

FIG. 6 is a flow chart illustrating a modified example of processing steps performed by the center 150 (ECU 160) according to the embodiment. The processing steps in FIG. 6 are a modified example of the processing steps in FIG. 3. The processing steps in FIG. 6 are repeatedly executed by the ECU 160, for example, while the center 150 is in operation.

First, at Step S601, the probe save processing unit 161 determines whether or not probe data transmitted from the navigation device 100 has been received. If having determined at Step S601 that the probe data has not been received (NO at Step S601), the probe save processing unit 161 executes the processing of Step S601 again.

On the other hand, if having determined at Step S601 that the probe data has been received (YES at Step S601), at Step S602, the probe save processing unit 161 saves the probe data on the travel DB 152.

Next, at Step S603, the signboard image recognition unit 162 performs a publicly-known image recognition process to recognize a signboard to be imaged in multiple images included in the probe data saved on the travel DB 152. Then, at Step S604, the signboard image recognition unit 162 determines whether or not the signboard for guiding the intersection has been recognized in the image by an image recognition process at Step S603.

If having determined at Step S604 that no signboard for guiding the intersection is recognized in the images (NO at Step S604), the ECU 160 ends the series of processing steps illustrated in FIG. 6.

On the other hand, if having determined at Step S604 that the signboard for guiding the intersection has been recognized in the images (YES at Step S604), at Step S605, for each of the multiple images included in the probe data, based on the positional relationship between the vehicle and the signboard in the image, the positional relationship information obtainment unit 163 determines an angle formed by the imaging direction of the signboard with respect to the traveling direction of the vehicle. For example, in the case where the probe data includes the images 501, 502, and 503 illustrated in FIG. 5, the positional relationship information obtainment unit 163 calculates an angle narrower than 45 degrees as the angle of the imaging direction of the signboard in the image 501. Also, the positional relationship information obtainment unit 163 calculates 45 degrees as the angle of the imaging direction of the signboard in the image 502. Also, the positional relationship information obtainment unit 163 calculates an angle wider than 45 degrees as the angle of the imaging direction of the signboard in the image 503.

Then, from among the multiple images included in the probe data, the signboard guide data save processing unit 164 prioritizes an image in which the angle identified at Step S605 is the predetermined angle as the image to be saved on the signboard guide DB 153. For example, in the case where the predetermined angle is set to 45 degrees, the signboard guide data save processing unit 164 prioritizes the image 501 for which the angle calculated by the positional relationship information obtainment unit 163 is 45 degrees, and saves the image on the signboard guide DB 153. Thereafter, the ECU 160 ends the series of processing steps illustrated in FIG. 6.

In this way, according to the image collection system 10 of the modified example, as a positional relationship between the signboard and the vehicle when an image of a signboard to be imaged is captured, an angle formed by the imaging direction of the signboard to be imaged with respect to the traveling direction of the vehicle can be identified from the positional relationship between the signboard and the vehicle in the image. Therefore, according to the present configuration, even if the imaging direction of the signboard to be imaged is shifted from the predetermined angle due to a change in imaging conditions (e.g., GPS accuracy), it is possible in practice to prioritize an image captured with the imaging direction of the signboard to be imaged at the predetermined angle, and to save the image on the signboard guide DB 153. Therefore, according to the present configuration, it is possible to increase the precision of an image of a signboard to be saved on the signboard guide DB 153.

As above, preferable embodiments according to the present invention have been described. Note that the present invention is not limited to these embodiments, and various changes and modifications can be made within the scope of the present invention described in the claims.

For example, in the embodiments, a signboard is used as an example of a "landmark object"; however, it is not limited as such. For example, the "landmark object" may be anything as long as it can be used as a landmark for guiding an intersection, such as a sign, bronze statue, building, or the like.

For example, in the embodiments, part of functions provided by the navigation device 100 may be provided in the center 150 or another information processing apparatus capable of connecting with the navigation device 100.

Also, for example, in the embodiments, part of functions provided on the navigation device 100 may be provided on the center 150 or another information processing apparatus capable of connecting with the center 150.

Also, in the embodiments described above, in the case where a change in the traveling lane of the vehicle has been detected by the lane change detection unit 116, multiple images captured by the camera 102 are all discarded without transmitting the images to the center 150; however, it is not limited as such. For example, in the case where a change in the traveling lane of the vehicle has been detected by the lane change detection unit 116, all of the multiple images captured by the camera 102 may be transmitted to the center 150, and at the center 150, the signboard guide data save processing unit 164 simply does not save (i.e., discards) any of the images on the signboard guide DB 153.

Also, in the embodiments described above, an image in which a landmark object (signboard) is captured from the predetermined angle is prioritized to be saved on the signboard guide DB 153 from among images captured by the camera 102; however, it is not limited as such.

For example, every image captured by the camera 102 may be associated with information representing the lane on which the vehicle is traveling and saved on the signboard guide DB 153. This enables, for example, to perform an image recognition process of a target object with a certain precision, by reading from the signboard guide DB 153 only an image associated with a particular traveling lane when performing the image recognition process of the target object. In this case, the information representing the lane on which the vehicle is traveling may be obtained externally (e.g., from the vehicle) or by identifying the traveling lane on which the vehicle is traveling in the image. Also, in this case, it is not necessary to calculate an angle formed by the direction of the landmark object with respect to the traveling direction of the vehicle.

Also, for example, all images captured by the camera 102 may be associated with information representing angle formed by the direction of the landmark object with respect to the traveling direction of the vehicle, to be saved on the signboard guide DB 153. In this case, for example, when performing an image recognition process of the target object, only an image associated with a specific angle is read from the signboard guide DB 153. This enables to perform the image recognition process of the target object with a certain precision. In this case, the information representing the angle formed by the direction of the landmark object with respect to the traveling direction of the vehicle may be obtained externally (e.g., from the vehicle) or by calculating from the positional relationship between the vehicle and the landmark object in the image. Also, in this case, it is not necessary to identify the traveling lane on which the vehicle is traveling.

Also, for example, all images captured by the camera 102 may be associated with both information representing the lane on which the vehicle is traveling and information representing the angle formed by the direction of the landmark object with respect to the traveling direction of the vehicle, to save on the signboard guide DB 153. This enables to perform the image recognition process of the target object with a certain precision, for example, by reading from the signboard guide DB 153 only an image associated with a particular traveling lane or an image associated with a specific angle when performing the image recognition process of the target object. In this case, the information representing the traveling lane on which the vehicle is traveling may be obtained externally (e.g., from the vehicle), or by identifying the traveling lane on which the vehicle is traveling in the image. Also, the information representing the angle formed by the direction of the landmark object with respect to the traveling direction of the vehicle may be obtained externally (e.g., from the vehicle), or by calculating from the positional relationship between the vehicle and the landmark object in the image.

In addition, other than the embodiments described above, an image collection system may include a vehicle communication unit that is constituted with an image obtainment unit to obtain an image of a landmark object captured by an imaging unit installed on a vehicle; and an image transmitter unit to transmit an image in which a landmark object is captured at a predetermined angle to the center from among images obtained by the image obtainment unit. In this case, the imaging direction of the landmark object in each image may be determined by the vehicle communication device (e.g., an "imaging direction identifying unit"). For example, the vehicle communication device may identify the imaging direction of the landmark object in an image, based on the positional information of the landmark object (longitude and latitude) and the current positional information of the vehicle (longitude and latitude). Also, for example, the vehicle communication device may identify the imaging direction of the landmark object in an image, based on the positional relationship between the vehicle and the landmark object in the image. The present configuration also enables to prioritize an image captured from a predetermined angle, and to save the image on the database. Therefore, according to the present configuration, it is possible to increase the precision of image recognition with respect to a landmark object in an image to be saved on a database and to avoid a reduction in the utilization efficiency of the database storage area.

The present international application is based on and claims the benefit of Japanese Patent Application No. 2017-155304, filed on Aug. 10, 2017, the entire contents of which are hereby incorporated by reference.

DESCRIPTION OF REFERENCE SYMBOLS 10 image collection system
100 navigation device (in-vehicle device)
101 communication I/F
102 camera (imaging device)
103 GPS
104 display
105 speaker
106 map data storage unit
110 ECU
111 road determination unit
112 imaging position calculation unit
113 imaging control unit
114 image obtainment unit
115 image transmitter unit
116 lane change detection unit
117 navigation client function unit
140 network
150 center (image collection device)
151 communication I/F
152 travel DB
153 signboard guide DB (database)
154 map DB
160 ECU
161 probe save processing unit
162 signboard image recognition unit
163 positional relationship information obtainment unit
164 signboard guide data save processing unit
165 route search unit
166 route guide unit
400 road
401 signboard
402 vehicle

The invention claimed is:

1. An image collection system comprising:
an electronic control unit (ECU) of a navigation device configured to:
calculate, for each of a plurality of traveling lanes on a road on which a vehicle is traveling, imaging positions in a traveling direction of the vehicle at which a landmark object is captured in an image from a predetermined angle, and
perform imaging control to cause a camera to capture a plurality of images at the calculated imaging positions with respect to each of the plurality of traveling lanes; and
an ECU of an image collection device configured to:
obtain positional relationship information representing a positional relationship between the landmark object and the vehicle when each of the plurality of the images are captured by the ECU of the navigation device, the position relationship information including at least one of information representing the respective traveling lane of the plurality of traveling lanes on which the vehicle is traveling and information representing an angle formed by a direction of the landmark object with respect to the traveling direction of the vehicle, associate the plurality of images captured by the ECU of the navigation device with the obtained positional relationship information, and save the plurality of associated images into a database.

2. The image collection system as claimed in claim 1, wherein the ECU of the image collection device is further configured to:

obtain, as the positional relationship information, the information representing the traveling lane on which the vehicle is traveling by identifying the traveling lane on which the vehicle is traveling using information from the plurality of images captured by the camera, and prioritize one of the plurality of images, the one of the plurality of images being an image captured at the imaging position corresponding to the traveling lane on which the vehicle is traveling, and save the one of the plurality of images in the database.

3. The image collection system as claimed in claim 1, wherein the ECU of the image collection device is further configured to:

obtain, as the positional relationship information, the information representing the angle formed by the direction of the landmark object with respect to the traveling direction of the vehicle by calculating the information from the positional relationship between the vehicle and the landmark object in each of the captured plurality of images, and prioritize one of the plurality of images, the one of the plurality of images having an angle that corresponds to the predetermined angle, and save the one of the plurality of images in the database.

4. The image collection system as claimed in claim 1, wherein:

the ECU of the navigation device is provided in an in-vehicle device installed in the vehicle, the ECU of the image collection device is installed in a facility separate from the vehicle, and the ECU of the navigation device is further configured to:
transmit, to the ECU of the image collection device, the captured plurality of images
detect a change in the traveling lane of the vehicle, and
not transmit, to the ECU of the image collection device, any of the plurality of images captured by the camera, in a case where a change in the traveling lane has been detected until a predetermined number of images are captured by the camera at the imaging position.

5. The image collection system as claimed in claim 1, wherein:

the ECU of the navigation device is further configured to detect a change in the traveling lane of the vehicle, and when change in the traveling lane has been detected, until a predetermined number of images are captured by the camera at the imaging position, the ECU of the image collection device does not store any of the plurality of images captured by the camera in the database.

6. An image collection method comprising:

calculating, for each of a plurality of traveling lanes on a road on which a vehicle is traveling, imaging positions in a traveling direction of the vehicle at which a landmark object is captured in an image from a predetermined angle; and controlling a camera to capture a plurality of images at the calculated imaging positions with respect to each of the plurality of traveling lanes;

obtaining positional relationship information representing a positional relationship between the landmark object and the vehicle when each of the plurality of the images are captured, the position relationship information including at least one of information representing the traveling lane of the plurality of traveling lanes on which the vehicle is traveling and information representing an angle formed by a direction of the landmark object with respect to the traveling direction of the vehicle;

associating the plurality of images with the obtained positional relationship information; and saving the plurality of associated images into a database.

7. An image collection device comprising:

an electronic control unit (ECU) of a navigation device configured to:

calculate, for each of a plurality of traveling lanes on a road on which a vehicle is traveling, imaging positions in a traveling direction of the vehicle at which a landmark object is captured in an image from a predetermined angle, and perform imaging control to cause a camera to capture a plurality of images at the calculated imaging positions with respect to each of the plurality of traveling lanes; and an ECU of an image collection device configured to:

obtain positional relationship information representing a positional relationship between the landmark object and the vehicle when each of the plurality of the images are captured, the position relationship information including at least one of information representing the traveling lane of the plurality of traveling lanes on which the vehicle is traveling and information representing an angle formed by a direction of the landmark object with respect to thee traveling direction of the vehicle, associate the plurality of images captured by the ECU of the navigation device with the obtained positional relationship information, and save the plurality of associated images into a database.

8. A non-transitory computer readable storage medium having a computer program, which, when executed by one or more computers, causes the one or more computers to perform processes comprising:

calculating, for each of a plurality of traveling lanes on a road on which a vehicle is traveling, imaging positions in a traveling direction of the vehicle at which a landmark object is captured in an image from a predetermined angle; and controlling a camera to capture a plurality of images at the calculated imaging positions with respect to each of the plurality of traveling lanes;

obtaining positional relationship information representing a positional relationship between the landmark object and the vehicle when each of the plurality of images are captured, the position relationship information including at least one of information representing the respective traveling lane of the plurality of traveling lanes on which the vehicle is traveling and information representing an angle formed by a direction of the landmark object with respect to the traveling direction of the vehicle;

associating the plurality of images with the obtained positional relationship information; and saving the plurality of associated images into a database.

9. A vehicle communication device comprising:
an electronic control unit (ECU) of a navigation device configured to:
calculate, for each of a plurality of traveling lanes on a road on which a vehicle is traveling, imaging positions in a traveling direction of the vehicle at which a landmark object is captured in an image from a predetermined angle, and
perform imaging control to cause a camera to capture a plurality of images at the calculated imaging positions with respect to each of the plurality of traveling lanes; and
an ECU of an image collection device configured to:
obtain positional relationship information representing a positional relationship between the landmark object and the vehicle when each of the plurality of the images are captured by the ECU of the navigation device, the position relationship information including at least one of information representing the respective traveling lane of the plurality of traveling lanes on which the vehicle is traveling and information representing an angle formed by a direction of the landmark object with respect to the traveling direction of the vehicle,
associate the plurality of images captured by the ECU of the navigation device with the obtained positional relationship information, and
save the plurality of associated images on a database.

* * * * *